(12) United States Patent
Wang et al.

(10) Patent No.: US 12,398,218 B2
(45) Date of Patent: Aug. 26, 2025

(54) EMULSION POLYMERISATION

(71) Applicant: CARGILL BIOINDUSTRIAL UK LIMITED, London (GB)

(72) Inventors: Min Ma Wang, Goole (GB); Weibo Wang, Goole (GB)

(73) Assignee: CARGILL BIOINDUSTRIAL UK LIMITED, London (GB)

( * ) Notice: Subject to any disclaimer, the term of this patent is extended or adjusted under 35 U.S.C. 154(b) by 732 days.

(21) Appl. No.: 17/774,722

(22) PCT Filed: Nov. 12, 2020

(86) PCT No.: PCT/US2020/060114
§ 371 (c)(1),
(2) Date: May 5, 2022

(87) PCT Pub. No.: WO2021/097014
PCT Pub. Date: May 20, 2021

(65) Prior Publication Data
US 2022/0389125 A1 Dec. 8, 2022

Related U.S. Application Data

(60) Provisional application No. 62/935,124, filed on Nov. 14, 2019.

(51) Int. Cl.
*C08F 2/32* (2006.01)
*C08F 220/56* (2006.01)
*C09J 133/26* (2006.01)

(52) U.S. Cl.
CPC .............. *C08F 2/32* (2013.01); *C08F 220/56* (2013.01)

(58) Field of Classification Search
CPC .......... C08F 2/32; C08F 22/056; C09J 133/26
See application file for complete search history.

(56) References Cited

U.S. PATENT DOCUMENTS

| | | | |
|---|---|---|---|
| 4,203,877 | A | 5/1980 | Baker |
| 4,772,659 | A | 9/1988 | Chan |
| 4,786,681 | A | 11/1988 | Baker et al. |
| 5,380,465 | A | 1/1995 | Baker et al. |
| 5,633,220 | A | 5/1997 | Cawiezel et al. |
| 6,686,417 | B1 | 2/2004 | Reekmans et al. |
| 9,701,890 | B2 | 7/2017 | Reichenbach-Klinke et al. |
| 10,421,912 | B2 | 9/2019 | Bezemer et al. |
| 2010/0331191 | A1 | 12/2010 | Bevinakatti et al. |

FOREIGN PATENT DOCUMENTS

| | | |
|---|---|---|
| WO | 9809998 A1 | 3/1998 |
| WO | 0126791 A2 | 4/2001 |

OTHER PUBLICATIONS

International Preliminary Report on Patentability and Written Opinion for International Application No. PCT/US2020/060114, issued May 17, 2022, 7 pages.
International Search Report and Written Opinion for International Application No. PCT/US2020/060114, dated Feb. 12, 2021, 8 pages.

*Primary Examiner* — Catherine S Branch

(57) ABSTRACT

A method of inverse emulsion polymerisation using an oil phase comprising a hydrocarbon oil obtainable from a gas to liquids process (a GTL oil) is described, in addition to an emulsion comprising a GTL oil and the use of a reaction product of an alk(en)yl substituted succinic anhydride and an amino alcohol to emulsify the emulsion.

15 Claims, No Drawings

EMULSION POLYMERISATION

CROSS-REFERENCE TO RELATED APPLICATIONS

This application is the U.S. National Phase of PCT/US2020/060114, filed Nov. 12, 2020, which claims priority to U.S. Provisional Application No. 62/935,124, filed Nov. 14, 2019, wherein the content of each of which is incorporated herein by reference in its entirety for all purposes.

FIELD OF THE INVENTION

The present invention relates to a method of inverse emulsion polymerisation using an oil phase comprising a hydrocarbon oil obtainable from a gas to liquids process (a GTL oil). The invention also relates to an emulsion comprising a GTL oil and the use of a reaction product of an alk(en)yl substituted succinic anhydride and an amino alcohol to emulsify the emulsion.

BACKGROUND

Emulsion polymerisation is well known as a route to produce many different polymers. An example of the polymers produced by emulsion polymerisation are polyacrylamide and co-polymers of acrylamide with other monomers. These polymers, known as PAM, may be used in aqueous systems and for such use it is desirable for the PAM to be available as an aqueous solution. Unfortunately, except at extreme dilution, aqueous solutions of PAM usually have very high viscosity. The handling of systems with such high viscosities is difficult on a large scale and so the industrial manufacture of PAM is usually carried out in an indirect manner. Typically, PAM is made by so-called inverse emulsion polymerisation. In this, acrylamide monomer, together with any co-monomer(s), and a polymerisation initiator, usually a free radical initiator, are dissolved in an aqueous phase, this solution is emulsified in an oil phase and the polymerisation initiated, typically by raising the temperature. The water-in-oil emulsion is typically stabilised by a surfactant system. At the end of polymerisation the system is an emulsion of aqueous phase droplets, containing dissolved PAM, in the oil phase. Although the viscosity of the aqueous PAM solution is high, the effective viscosity of the emulsion is determined primarily by that of the oil phase and this is chosen to be suitably low. To introduce the PAM effectively into the aqueous systems in which it is to be used, the emulsion has to be broken. Typically, the emulsion is designed so that it undergoes inversion on simple dilution into water. This general type of synthetic method is usually referred to as inverse emulsion polymerisation.

The requirements for a surfactant or surfactant system used in inverse emulsion polymerisation are thus somewhat unusual because the surfactant must provide adequate emulsion stability before, during and after (for storage) the polymerisation reaction, but must permit ready breaking of the emulsion during inversion on dilution into water, to facilitate rapid release of the polymer (e.g. PAM) into the aqueous phase in which it will act.

Conventionally, the oil phase used in an emulsion polymerisation process has been a mineral oil obtained from a crude oil fraction by distillation of the crude oil (a crude oil distillate). Current environmental concerns may make the use of a crude oil distillate undesirable in the emulsion polymerisation process or in the application of the resulting emulsion polymer.

It would be desirable to use an alternative source for the oil phase used in emulsion polymerisation. One alternative to a crude oil distillate is a hydrocarbon oil obtainable from a gas to liquids (GTL) process (a GTL oil). A GTL process converts a starting gas to become a larger hydrocarbon from which a hydrocarbon oil (the GTL oil) can be produced. A GTL oil has a different hydrocarbon structure and different chemical composition compared with a crude oil distillate since it is produced in an entirely different way e.g. by chemical reaction of a gas instead of distillation of a crude oil. Due to these differences, it has not previously been possible to carry out a successful inverse emulsion polymerisation using an oil phase comprising a GTL oil with a conventional surfactant system.

SUMMARY OF THE INVENTION

We have surprisingly discovered a surfactant which enables inverse emulsion polymerisation using an oil phase comprising a GTL oil. This has advantages since using a GTL oil may be more economical, more environmentally friendly (for example more readily biodegradable, or including a lower level of volatile organic compounds—VOC) or it may support a higher loading of polymer or other additives in the emulsion. It may also overcome other disadvantages of the prior art. Thus viewed from a first aspect, the present invention provides a method of making a polymer by inverse emulsion polymerisation which comprises the steps of: (i) forming an emulsion comprising an aqueous phase of polymerisable monomers dispersed in an oil phase comprising a GTL oil, wherein the GTL oil is a hydrocarbon oil obtainable from a gas to liquids (GTL) process, wherein the emulsion also includes a surfactant which is obtainable by reacting an alk(en)yl substituted succinic anhydride and an amino alcohol at a molar ratio of 1:at least 1.05, and (ii) polymerising the polymerisable monomers to form an emulsion of the aqueous phase comprising the resulting polymer, in the oil phase.

Viewed from a second aspect, the invention provides an emulsion comprising an aqueous phase and an oil phase, wherein a polymer is included in the aqueous phase, wherein the oil phase comprises a GTL oil and wherein the emulsion further comprises a surfactant which is obtainable by reacting an alk(en)yl substituted succinic anhydride and an amino alcohol at a molar ratio of 1:at least 1.05.

Viewed from a third aspect, the invention provides the use of a reaction product of an alk(en)yl substituted succinic anhydride and an amino alcohol wherein the molar ratio of alk(en)yl substituted succinic anhydride reacted with amino alcohol is 1:at least 1.05, to emulsify an emulsion including an oil phase which comprises a GTL oil. The emulsion of the invention may provide one or more of the following advantages when compared with an emulsion prepared using a crude oil distillate: more stable emulsion, higher density, more readily biodegradable, more thermal stability and/or longer shelf life.

Any or all of the features described herein may be included or combined in any aspect of the invention in any combination.

DETAILED DESCRIPTION OF THE INVENTION

It will be understood that any upper or lower quantity or range limit used herein may be independently combined.

It will be understood that, when describing the number of carbon atoms in a substituent group or compound (e.g. 'C1 to C6'), the number refers to the total number of carbon atoms present in the substituent group or compound, including any present in any branched groups. Additionally, when describing the number of carbon atoms in, for example fatty acids, this refers to the total number of carbon atoms including the one at the carboxylic acid, and any present in any branch groups.

As defined herein, a 'GTL oil' is a hydrocarbon oil obtainable from a gas to liquids (GTL) process. A GTL process converts a starting gas to become a larger hydrocarbon from which the GTL oil can be produced.

As defined herein, a 'mineral oil' is a crude oil distillate and is not a GTL oil. Many of the chemicals which may be used to produce the compound and composition of the present invention are obtained from natural sources. Such chemicals typically include a mixture of chemical species due to their natural origin. Due to the presence of such mixtures, various parameters defined herein can be an average value and may be non-integral.

Surfactant of the Invention

The surfactant of the invention is the reaction product of an alk(en)yl substituted succinic anhydride and an amino alcohol. The molar ratio of alk(en)yl substituted succinic anhydride reacted with amino alcohol to form the surfactant is 1:at least 1.05, preferably 1:at least 1.1, more preferably 1:at least 1.15, especially 1:at least 1.2. The molar ratio of alk(en)yl substituted succinic anhydride reacted with amino alcohol to form the surfactant is 1:at most 10, preferably 1:at most 8, more preferably 1:at most 6, especially 1:at most 4. This non-equimolar ratio may advantageously influence the composition of the resulting surfactant. An equimolar ratio of alk(en)yl substituted succinic anhydride reacted with amino alcohol to form the surfactant (see Example 2 herein) may produce a surfactant which is not successful in an inverse emulsion polymerisation comprising a GTL oil (see Tables 4 & 5 herein—Surfactant System D fails due to emulsion breaking).

The alk(en)yl substituted succinic anhydride used to form the surfactant comprises an alk(en)yl group. The alk(en)yl, preferably alkenyl, group is suitably a polyolefin obtained by polymerizing a monoolefin, preferably containing in the range from 2 to 6, more preferably 3 to 4 carbon atoms. Suitable monoolefins include ethylene, propylene, butylene, isobutylene and mixtures thereof. Isobutylene is particularly preferred. Thus, polyisobutylene (PIB) is a particularly preferred alk(en)yl group. Polyisobutylene succinic anhydride (PIBSA) is a particularly preferred alk(en)yl substituted succinic anhydride.

In one embodiment, the alk(en)yl group is a C6 to C20, preferably C8 to C18 alkene. Specific examples include octene, dodecene and octadecene, which may be linear or branched. Suitable alk(en)yl substituted succinic anhydrides are octene succinic anhydride (OSA), branched dodecene succinic anhydride (DDSA), and octadecene succinic anhydride (OSA).

The alk(en)yl group is suitably reacted with maleic anhydride, maleic acid, or mono- or di-C1 to C6 alkyl or alkenyl maleates, e.g. dibutyl maleate, preferably with maleic anhydride, to form the alk(en)yl substituted succinates using methods well known in the art.

The alk(en)yl group suitably comprises in the range from 5 to 180, preferably 10 to 55, more preferably 13 to 30, particularly 15 to 20, and especially 16 to 18 monomer units, preferably monoolefin units, and particularly isobutylene units. The alk(en)yl substituted succinic anhydride is obtainable by reacting maleic anhydride, maleic acid, or mono- or di-C1 to C6 alkyl or alkenyl maleates, e.g. dibutyl maleate, preferably maleic anhydride, with monoolefin, preferably PIB, at a molar ratio of suitably 0.3 to 1.8:1, preferably 0.6 to 1.5:1, more preferably 0.8 to 1.3:1, particularly 0.9 to 1.1:1, and especially 0.95 to 1.05:1.

The amino alcohol which is reacted with the alk(en)yl substituted succinic anhydride preferably comprises at least one hydroxyl group, more preferably at least 2 hydroxyl groups, particularly preferably comprises 2 hydroxyl groups. The amino alcohol may comprise at most 4, preferably at most 3 hydroxyl groups. The amino alcohol may comprises at least one amine group, preferably comprises one amine group, more preferably comprises one secondary amine group. The amino alcohol may comprise at most 3, preferably at most 2 amine groups.

The amino alcohol is preferably selected from monoethanolamine, diethanolamine (DEA), dipropanolamine, tris(hydroxymethyl)aminomethane, more preferably selected from monoethanolamine, diethanolamine (DEA), dipropanolamine, and particularly preferably is diethanolamine (DEA).

The surfactant is preferably obtainable by reacting the alk(en)yl substituted succinic anhydride and the amino alcohol at a reaction temperature of less than 150° C., preferably less than 130° C., more preferably less than 110° C., particularly less than 95° C., desirably less than 90° C. The reaction temperature may be at least 50° C., preferably at least 60° C., more preferably at least 65° C., particularly at least 70° C. These reaction temperature ranges (especially about 70 to 90° C.) may advantageously increase the formation of amide species in the reaction product and/or reduce the formation of ester species. Preferably the surfactant is obtainable using reaction conditions which increase the formation of amide species and/or reduce the formation of ester species in the reaction product. A reaction temperature of less than 110° C. (for example about 70 to 90° C.) may produce a surfactant which is successful in an inverse emulsion polymerisation comprising a GTL oil as shown in Example 1 and Table 5 (Surfactant System E) herein.

For better control of the reaction to produce the surfactant, a diluent medium may be added to reduce the viscosity of the reaction mix. The diluent is often added before the reaction commences. Diluents useful for the reaction includes many hydrocarbon oils, for example a crude oil distillate such as a paraffinic mineral oil. The surfactant (reaction product) may comprise ester, amide and acid-amine salt components. The molar ratio of ester:amide in the surfactant may be 1:at least 1.1, preferably 1:at least 1.3. The molar ratio of ester:amide in the surfactant may be 1:at most 5, preferably 1:at most 3. The molar ratio of ester:amide:salt in the surfactant may be 1:at least 1.1:at least 0.5. The molar ratio of ester:amide:salt in the surfactant may be 1:at most 5:at most 3. Without being bound by theory, a higher proportion of amide and/or acid-amine salt in the surfactant may advantageously improve its performance with the GTL oil by increasing the hydrophilicity of the head group of the surfactant.

The surfactant may have a weight average molecular weight (Mw), measured by Gel Permeation Chromatography (GPC) against polystyrene standards, in the range from 500 to 50,000 g/mol, preferably 750 to 10,000 g/mol, more preferably 1,000 to 5,000 g/mol, particularly 1,200 to 4000 g/mol, and especially 1,500 to 3,000 g/mol.

The surfactant preferably has an acid value (measured as described herein) in the range from 1 to 50, more preferably 5 to 40, particularly 10 to 35, and especially 15 to 30 mg KOH/g.

Surfactant System

The surfactant of the invention may be used in neat (undiluted) form, but is preferably used as part of a surfactant system in the emulsion polymerisation. Preferably the surfactant system further comprises a co-emulsifier. The co-emulsifier is preferably hydrophobic/lipophilic. The co-emulsifier may have an HLB value (measured as known in the art e.g. by Griffin's method) in the range 1.5 to 7.5, desirably from 2 to 6. Suitable co-emulsifiers include sorbitan fatty acid esters, specifically mono, sesqui, and/or tri-fatty acid esters, particularly C14 to C20 mono-unsaturated fatty acid, especially oleic acid, esters. Preferably the co-emulsifier comprises sorbitan mono-oleate, particularly is sorbitan mono-oleate. The co-emulsifier may also include glycerol mono and/or di-fatty acid esters, particularly C14 to C20 mono-unsaturated fatty acid, especially oleic acid, esters; and fatty acid alkanolamides, particularly ethanolamides, especially diethanolamides, particularly those based on C14 to C20 mono-unsaturated fatty acids, especially oleic acid. The oleic acid in the co-emulsifier may be provided by mixed fatty acid feedstocks e.g. rape seed fatty acids, including C14 to C20 mono-unsaturated fatty acid, particularly oleic acid, as a main constituent. Particular examples of the co-emulsifiers include those available under the Trade Mark Span e.g. Span 80, from Croda.

The relative hydrophobicity of the surfactant and the co-emulsifier means that they can readily be used in combination in emulsifying water-in-oil emulsions. The surfactant system may comprise at least 50 wt % of the co-emulsifier, preferably at least 60 wt %, more preferably at least 70 wt %, particularly at least 80 wt %. The surfactant system may comprise at most 90 wt % of the co-emulsifier.

The surfactant system may comprise at most 50 wt % of the surfactant of the invention, preferably at most 40 wt %, more preferably at most 30 wt %, particularly at most 20 wt %. The surfactant system may comprise at least 10 wt % of the surfactant.

The weight ratio of surfactant of the invention:co-emulsifier may be 1:at least 1, preferably 1:at least 1.5. more preferably 1:at least 2, particularly 1:at least 3. The weight ratio of surfactant:co-emulsifier may be 1:at most 10, preferably 1:at most 8, more preferably 1:at most 6.

The surfactant system is typically used in as low a concentration as is practical since the use of higher concentrations not only increases the cost, but will also make the polymer emulsion more difficult to invert in end use applications or treatments. Typically the surfactant system is used in an amount of at least 1%, preferably at least 1.5%, more preferably at least 2% by weight of total emulsion. The surfactant system may be used in an amount of at most 10%, preferably at most 8%, more preferably at most 6% by weight of total emulsion. Preferably the surfactant system is used from about 2 to 6%, particularly from about 2 to 4%, by weight of total emulsion.

Aqueous Phase

The aqueous phase comprises the polymerisable monomers and/or polymer as described herein. The aqueous phase may comprise at least 10%, preferably at least 20%, more preferably at least 30% water by weight of the aqueous phase. Preferably the monomer(s) are dissolved in water, generally in an amount of about 20 to about 80% by weight of total emulsion. The aqueous phase may further comprise a polymerisation initiator. Preferably the polymerisation initiator is a temperature activated initiator. The aqueous phase may comprise at least one of a chain transfer agent, a catalyst, an initiator and a sequesterant.

Oil Phase

The oil phase of the emulsion comprises a GTL oil. The GTL oil is a hydrocarbon oil obtainable by a gas to liquid (GTL) process. Preferably the GTL oil is obtainable from a Fischer-Tropsch process. The GTL oil has a different hydrocarbon structure and different chemical composition compared with a mineral oil or crude oil distillate since it is produced in an entirely different way e.g. by chemical alteration or conversion of a gas instead of distillation of a crude oil. The GTL oil may differ from a crude oil distillate by containing virtually no sulphur, nitrogen and/or aromatic species (e.g. less than 1000 ppm, preferably less than 500 ppm, desirably less than 100 ppm by weight of each species in the GTL oil). The GTL oil may be obtained or derived from a GTL process.

The GTL oil may comprise C18 to C50 hydrocarbons. The GTL oil may comprise at least 50%, preferably at least 60%, more preferably at least 70%, particularly at least 80%, desirably at least 90% of C18 to C50 hydrocarbons by weight of the GTL oil. The GTL oil may comprise at most 50%, preferably at most 40%, more preferably at most 30%, particularly at most 20%, desirably at most 10% of C1 to C17 hydrocarbons by weight of the GTL oil. The GTL oil may comprise at most 30%, preferably at most 20%, more preferably at most 10%, particularly at most 5%, desirably at most 2% of C8 to C16 hydrocarbons by weight of the GTL oil. The GTL oil may comprise at most 5%, preferably at most 2%, more preferably at most 1%, particularly at most 0.5%, desirably at most 0.2% of aromatic hydrocarbons by weight of the GTL oil. The GTL oil may comprise a higher % by weight of branched hydrocarbons than a crude oil distillate of equivalent viscosity.

The GTL oil may have a higher carbon chain length and/or number of carbon atoms and/or a lower aromatic content than crude oil distillates which have previously been used in emulsion polymerisation. These differences may cause the need for different surfactants to be used with the GTL oil, for example due to its stronger hydrophobicity from the higher number of carbon atoms. Without being bound by theory, a more hydrophobic oil phase may require a more energetic/stronger surfactant system to emulsify the aqueous phase into the oil phase.

The GTL oil may comprise at most 50 mg/kg sulphur when measured according to ISO 14596, preferably at most 40 mg/kg, more preferably at most 30 mg/kg, particularly at most 20 mg/kg, desirably at most 10 mg/kg, especially at most 5 mg/kg.

The oil phase may comprise at least one further oil as well as the GTL oil. Such further oils include hydrocarbon oils, preferably paraffinic, particularly iso-paraffinic oils. When used with at least one further oil, the GTL oil may be at least 50%, preferably at least 60%, more preferably at least 80%, particularly at least 90% and desirably at least 95% by weight of the oil phase.

The oil phase may comprise less than 30% mineral oil, preferably less than 20%, more preferably less than 10%, particularly less than 5% by weight of the oil phase.

Method of Emulsion Polymerisation

The invention provides a method of making a polymer by emulsion polymerisation which comprises the steps of:

(i) forming an emulsion comprising an aqueous phase of polymerisable monomers dispersed in an oil phase comprising a GTL oil, wherein the GTL oil is a hydrocarbon oil obtainable from a gas to liquids (GTL) process, wherein the emulsion also includes a surfactant which is obtainable by reacting an alk(en)yl substituted succinic anhydride and an amino alcohol at a molar ratio of 1:at least 1.05, and (ii) polymerising the polymerisable monomers to form an emulsion of the aqueous phase comprising the resulting polymer, in the oil phase.

Preferably the emulsion polymerisation is an inverse emulsion polymerisation. The general process methodology for carrying out the polymerisation according to the invention is broadly similar to conventional inverse acrylamide emulsion polymerisation processes. Thus the monomer(s) are dissolved in water, generally in an amount of about 20 to about 80% by weight of total emulsion, together with chain transfer agents, catalysts, initiators and sequesterants as required, this solution is dispersed in the oil, which includes the surfactant or surfactant system and the polymerisation is initiated e.g. by heating. The oil phase of the emulsion is generally from about 5 to about 50%, desirably about 25 to about 40% by weight of the emulsion and the aqueous phase correspondingly comprises about 95 to about 50%, desirably about 75 to about 60%, by weight of the emulsion. The ratio of the aqueous phase to oil phase is typically in from about 0.5:1 to about 3:1, and is usually about 2:1 by weight.

The produced emulsion preferably permits ready breaking of the emulsion and inversion upon mixing with water, to facilitate rapid release of the polymer (e.g. PAM) into the aqueous phase in which it will act.

The method optionally comprises step (iii):

(iii) inverting the emulsion to release the polymer, preferably by mixing with water.

Polymers produced by the Emulsion Polymerisation

The polymer produced by (resulting from) the emulsion polymerisation of the invention may be neutral, cationic or anionic, preferably cationic or anionic. Preferably the polymer is a water soluble polymer. Examples of neutral polymers which may be produced or used in the invention are Poly(acrylamide), Poly(N,N-dimethylacrylamide), Poly(N-isopropyl acrylamide), Poly(N-octyl acrylamide), Poly(N-tert-butyl acrylamide), Poly(N-phenyl acrylamide), Poly(N-sec-butyl acrylamide). Examples of anionic polymers are copolymers of acrylamide and (Meth)acrylic acid, and/or 2-Acrylamido-2-methylpropane sulfonic acid (AMPS). Examples of cationic polymers are poly(dimethyldiallylammonium chloride) poly(acrylooxyethyltrimethyl ammonium chloride). Preferably the cationic polymer is a copolymer of at least one monomer comprising a quaternary nitrogen group with (meth)acrylamide monomer.

Preferably the polymerisable monomers used to make the polymer comprise (meth)acrylamide or a derivative thereof, preferably (meth)acrylamide, more preferably acrylamide. Preferably the polymer comprises (meth)acrylamide, more preferably acrylamide monomer.

In addition to acrylamide itself, the monomers that can be used in making polyacrylamide include substituted acrylamides, such as dimethylaminoethyl (meth)acrylate and/or trimethylaminoethyl (meth)acrylate chloride, and/or other nitrogen containing copolymerisable monomers, such as dimethyldiallylammonium chloride, included to make the polymer generated cationic and acidic copolymerisable monomers such as (meth)acrylic acid included to make the polymer generated anionic. The proportion of comonomers included depends on the desired level of cationicity or anionicity desired in the polymer. Typically when used amounts of comonomers can vary from a few percent up to about 80 weight % based on the total polymerisable monomers used. The inclusion of such comonomers is well known in the manufacture of polyacrylamides for water treatment uses.

Typically the resulting polymers have a (number average) molecular weight of at least 3 kDa (3,000 g/mol), but more usually the molecular weight is at least 20 kDa, more desirably at least 100 kDa and especially at least 1 MDa. Typically the maximum molecular weight is at most 50 MDa, preferably at most 40 MDa, more preferably at most 30 MDa, particularly at most 20 MDa.

Emulsion

The invention provides an emulsion comprising an aqueous phase and an oil phase, wherein a polymer is included in the aqueous phase, wherein the oil phase comprises a GTL oil and wherein the emulsion further comprises a surfactant which is obtainable by reacting an alk(en)yl substituted succinic anhydride and an amino alcohol at a molar ratio of 1:at least 1.05.

The emulsion may comprises any of the features described herein, for example the polymer in the emulsion, preferably in the aqueous phase, may comprise any of the features of the polymerisable monomers or resulting polymers described herein, the aqueous phase of the emulsion may comprise any of the features of the aqueous phase described herein and/or the oil phase of the emulsion may comprise any of the features of the oil phase described herein. Preferably the aqueous phase of the emulsion is dispersed within the oil phase.

The oil phase of the emulsion is generally from about 5 to about 50%, desirably about 25 to about 40% by weight of the emulsion and the aqueous phase correspondingly comprises about 95 to about 50%, desirably about 75 to about 60%, by weight of the emulsion. The ratio of the aqueous phase to oil phase is typically in from about 0.5:1 to about 3:1, and is usually about 2:1 by weight. Preferably, the viscosity of the emulsion is less than 2500 mPa·s (cps) at 20° C. when measured by Brookfield viscometer as defined herein, more preferably less than 2000 mPa·s, particularly less than 1500 mPa·s. The viscosity of the emulsion may be at least 50 mPa·s at 20° C. when measured by Brookfield viscometer as defined herein, more preferably at least 100 mPa·s, particularly at least 150 mPa·s.

Preferably the particle size of the aqueous phase of the emulsion is at most 500 nm, measured by dynamic light scattering (DLS) as defined herein, more preferably at most 400 nm, more preferably at most 300 nm. Preferably the particle size of the aqueous phase of the emulsion is at least 50 nm, measured by DLS as defined herein, more preferably at least 100 nm, more preferably at least 150 nm.

The emulsion may be used in a method of fluid treatment comprising the step of adding the emulsion to a fluid to be treated. The fluid may comprise at least 50 wt % water, preferably at least 60 wt %, more preferably at least 80 wt %. The fluid may be contaminated water and the fluid treatment may be a cleaning or water treatment. The fluid may be a hydrocarbon containing fluid. The fluid treatment may be part of a hydrocarbon production method. The emulsion may be used in a hydraulic fracturing fluid which may further comprise one or more proppants (e.g. sand, ceramic or bauxite).

The emulsion of the invention may provide one or more of the following advantages when compared with an emulsion prepared using a crude oil distillate: higher density, inherently biodegradable, more thermal stability, longer shelf life, and the potential to include a higher amount (e.g. wt %) of proppants (e.g. sand, ceramic or bauxite) in the emulsion.

Use of the Surfactant

The invention provides the use of a reaction product of an alk(en)yl substituted succinic anhydride and an amino alcohol wherein the molar ratio of alk(en)yl substituted succinic anhydride reacted with amino alcohol is 1:at least 1.05, to emulsify an emulsion including an oil phase which comprises a GTL oil.

The use may comprises any of the features described herein.

The surfactant of the invention may provide a stronger head group (more hydrophilic) with stronger hydrogen and electronic bonding to the aqueous phase compared with a conventional ester based surfactant. Without being bound by theory, a higher proportion of amide and/or acid-amine salt in the surfactant may advantageously improve its performance with the GTL oil by increasing the hydrophilicity of the head group of the surfactant. This may improve the stabilisation of the aqueous droplets in a GTL oil which has a longer carbon chain length and fewer aromatic species than a conventional mineral oil.

Thus the use may comprise the technical effect of improving the stability of the emulsion, preferably the use comprises stabilising the emulsion.

Any of the features described herein may be combined in any aspect of the invention in any combination.

EXAMPLES

The invention is illustrated by the following non-limiting examples. All parts and percentages are given by weight unless otherwise stated. All tests and physical properties herein have been determined at atmospheric pressure and room temperature (i.e. about 20° C.), unless otherwise stated herein, or unless otherwise stated in the referenced test methods and procedures.
Test Methods In this specification the following test methods were used unless otherwise stated.
(i) FT-IR Spectroscopy FT-IT spectra was collected by a Nicolet iS10 SFT-IR spectrometer from Thermo Scientific. It is set up to run samples using a diamond ATR (attenuated total reflectance) accessory. A background (32 scans) was run before every sample to be analyzed. A small drop of sample was placed onto the diamond window and again ran 32 scans. The resulting FT-IR spectra are acquired and displayed over the range from 650 to 4000 cm$^{-1}$, with a resolution of 4 cm$^{-1}$. From peak analysis of the spectra, a quantification of the molar ratios of different species in the sample can be made.
(ii) Acid Value The acid value is defined as the number of mg of potassium hydroxide required to neutralise the free acids in 1 g of sample, and was measured by direct titration with a standard potassium hydroxide solution.
(iii) Viscosity Viscosity was measured by Brookfield digital viscometer (Model DV-II), with spindle #62 at 20 rpm and 20° C.
(iv) Particle Size Particle size was measured by Dynamic Light Scattering (DLS) using a Malvern Zetasizer.

Example 1

A surfactant (51) according to the invention which is the reaction product of polyisobutylene succinic anhydride (PIBSA) and diethanolamine (DEA) at a 1:1.28 molar ratio of PIBSA:DEA was produced as follows. 300.2 g of PIBSA and 178 g of paraffinic oil were added to a reaction flask. With nitrogen sparge and agitation on, heat the flask to 70° C. Charge 37.3 g DEA into the reactor through an addition funnel over 0.5 hours, and control the reactor temperature at 70-85° C. After all DEA was charged, heat the reaction to 85° C., and keep at this temperature for 2 hours or until an acid value of 25-30 mg KOH/g was obtained.

Analysis of S1 by Fourier Transform Infrared (FTIR) Spectroscopy as described herein indicates a molar ratio in the product of ester:amide:acid-amine salt of about 1:1.5:1.

Comparative Example 2

A surfactant (S2) according to a comparative example which is the reaction product of PIBSA and DEA at a 1:1 molar ratio of PIBSA:DEA was produced as follows. 396.8 g of PIBSA and 190 g of paraffinic oil were added to a reaction flask. With nitrogen sparge and agitation on, start heating the reactor to 115° C. at max rate. Charge 45.2 g DEA into the reactor through an addition funnel over 5 mins, and control the reactor temperature at 115±5° C. Once all DEA is charged, keep the reaction at 115° C. for 30 minutes. Heat the reactor to the temperature range of 130-140° C. Take a sample every 0.5 hour until an acid value of 5-15 mg KOH/g was obtained.

Analysis of S2 by Fourier Transform Infrared (FTIR) Spectroscopy as described herein indicates a molar ratio in the product of ester:amide:salt of about 1.5:1:0.1.

Example 3

A cationic polymer (CP1) as shown in Table 1 and an anionic polymer (AP1) as shown in Table 2 were made by inverse emulsion polymerisation using the procedure detailed below.

TABLE 1

| components for cationic polymer CP1 | |
|---|---|
|  | Parts by weight |
| Aqueous Phase | |
| Acrylamide (AM, 50% in aqueous solution) | 239 |
| DMAEMA * MeCl (80% in aqueous solution) | 349 |
| Ethylenediamine tetraacetic acid (EDTA, 5% in aqueous solution) | 4 |
| Distilled Water | 83 |
| Potassium Bromate (1.5% in aqueous solution) | 8 |
| Oil Phase | |
| GTL oil-a hydrocarbon process oil obtainable from a Fischer-Tropsch GTL process | 274 |
| Surfactant System | 27 |
| Initiator Feed | |
| Sodium Metabisulphite (0.15% in aqueous solution) | 16 |
| Total | 1000 |

TABLE 2

| components for Anionic Polymer AP1 | |
|---|---|
|  | Parts by weight |
| Aqueous Phase | |
| Acrylamide (AM, 50% in aqueous solution) | 466 |
| Acrylic Acid (AA) | 100 |
| Sodium hydroxide (NaOH, pellet) | 27 |

TABLE 2-continued

| components for Anionic Polymer AP1 | |
|---|---|
| | Parts by weight |
| Ethylenediamine tetraacetic acid (EDTA, 5% in aqueous solution) | 4 |
| Distilled Water | 41 |
| Potassium Bromate (1.5% in aqueous solution) | 8 |
| Oil Phase | |
| GTL oil-a hydrocarbon process oil obtainable from a Fischer-Tropsch GTL process | 316 |
| Surfactant System | 22 |
| Initiator Feed | |
| Sodium Metabisulphite (0.15% in aqueous solution) | 16 |
| Total | 1000 |

For each of CP1 and AP1, five different surfactant systems (A to E) were tested for performance. The composition of the surfactant systems is given in Table 3—A to D are comparative examples and E is of the invention.

TABLE 3

| surfactant systems | |
|---|---|
| Surfactant System | Composition |
| A | 100 wt % Sorbitan mono-oleate |
| B (containing 80 wt % A) | 20 wt % ABA block polymer of polyhydroxystearic acid and PEG; 80 wt % Sorbitan mono-oleate |
| C (containing 80 wt % A) | 20 wt % Star polymer of ethoxylated sorbitol and polyhydroxystearic acid; 80 wt % Sorbitan mono-oleate |
| D (containing 80 wt % A) | 20 wt % of Surfactant S2 from Comparative Example 2; 80 wt % Sorbitan mono-oleate |
| E (containing 80 wt % A) | 20 wt % of Surfactant S1 from Example 1 of the invention; 80 wt % Sorbitan mono-oleate |

Inverse Emulsion Polymerisation Procedure
Aqueous Part:
1. Mix monomers (e.g. for AP1=50% AM and 100% AA) and water into the beaker.
2. Add EDTA (5% solution), mix.
3. Add NaOH (pellet) to neutralize pH, use Mixer to mix it. (about 10-15 mins) (For the cationic polymerization, no need to add the NaOH to neutralize pH)
4. Add 1.5% potassium bromate solution to the monomer solution and mix.
Oil Part:
5. Add the Surfactant System into the beaker followed by the GTL oil and mix well.
Make Pre-Emulsion:
6. Slowly add aqueous part to the oil part with Silverson homogenizer at half speed (4000 rpm). After all aqueous solution is added, increase the speed to full (>9000 rpm) and mix for 3 minutes.
Emulsion Polymerization:
1. Attach stirring shaft, thermometer, nitrogen purge tube, condenser to the reaction vessel
2. Purge with nitrogen for 30 min while heat the water bath to 35° C.
3. Pump initiator solution (0.15% Sodium Metabisulphite solution) with a syringe pump at speed of 8 ml/h. Start the polymerization process.
4. Two hours later, after all initiator solution pumped in, manually push the rest 3 ml initiator to the reactor to see if the T increase or not. Then manually add 5 g of 10% Na-metabisulphite solution slowly to mop up the monomer residue.
5. Hold the temperature for 10 min at each level.
6. Turn off the water bath, cool the solution to room temperature and turned off nitrogen.

Example 4

The performance of the surfactant systems A to E (see Table 3) in the production of an inverse emulsion polymer is shown with regard to CP1 and AP1 in Table 4 (CP1) and Table 5 (AP1).

TABLE 4

| Cationic polymer (CP1) | | | |
|---|---|---|---|
| Surfactant System | Emulsion polymer appearance | Viscosity at 20° C. (mPa·s) | Particle size (nm) |
| A | Gel-failed due to emulsion breaking | n/a | n/a |
| B | Thick emulsion | 4008 | 196 |
| C | Thick emulsion | 2550 | 201 |
| D | Gel-failed due to emulsion breaking | n/a | n/a |
| E | Emulsion | 1174 | 233 |

TABLE 5

| Anionic polymer (AP1) | | | |
|---|---|---|---|
| Surfactant System | Emulsion polymer appearance | Viscosity at 20° C. (cps) | Particle size (nm) |
| A | Gel-failed due to emulsion breaking | n/a | n/a |
| B | Gel-failed due to emulsion breaking | n/a | n/a |
| C | Gel-failed due to emulsion breaking | n/a | n/a |
| D | Gel-failed due to emulsion breaking | n/a | n/a |
| E | Emulsion | 297 | 264 |

It can be seen from Tables 4 & 5 that Surfactant System E comprising a surfactant (S1) according to the invention is the only system which can successfully emulsify both the CP1 and AP1 inverse emulsion polymerisation systems comprising a GTL oil. Surfactant systems A to D are comparative and fail to emulsify CP1 and/or AP1. It is to be understood that the invention is not to be limited to the details of the above embodiments, which are described by way of example only. Many variations are possible.

The invention claimed is:
1. A method of making a polymer by inverse emulsion polymerisation which comprises the steps of:
(i) forming an emulsion comprising an aqueous phase of polymerisable monomers dispersed in an oil phase comprising a GTL oil, wherein the GTL oil is a hydrocarbon oil obtained from a gas to liquids (GTL) process, wherein the emulsion also includes a surfactant which is obtained by reacting an alk(en)yl substituted succinic anhydride and an amino alcohol at a molar ratio of 1:at least 1.05, and

(ii) polymerising the polymerisable monomers to form an emulsion of the aqueous phase comprising the resulting polymer, in the oil phase.

2. The method according to claim 1 wherein the GTL oil is obtained from a Fischer-Tropsch process.

3. The method according to claim 1 wherein the oil phase comprises less than 10% mineral oil by weight of the oil phase.

4. The method according to claim 1 wherein the surfactant is part of a surfactant system which further comprises a co-emulsifier.

5. The method according to claim 1 wherein the alk(en)yl substituted succinic anhydride is a polyisobutylene succinic anhydride (PIBSA).

6. The method according to claim 1 wherein the amino alcohol is diethanolamine (DEA).

7. The method according to claim 1 wherein the polymerisable monomers comprise (meth)acrylamide or a derivative thereof.

8. The method according to claim 1 wherein the resulting polymer is a cationic or anionic polymer.

9. An emulsion comprising an aqueous phase and an oil phase, wherein a polymer is included in the aqueous phase, wherein the oil phase comprises a GTL oil and wherein the emulsion further comprises a surfactant which is obtained by reacting an alk(en)yl substituted succinic anhydride and an amino alcohol at a molar ratio of 1:at least 1.05.

10. An emulsion according to claim 9 wherein the alk(en)yl substituted succinic anhydride is a polyisobutylene succinic anhydride (PIBSA).

11. An emulsion according to claim 9 wherein the amino alcohol is diethanolamine (DEA).

12. An emulsion according to claim 9 wherein the polymer comprises (meth)acrylamide monomer.

13. An emulsion according to claim 9 wherein the viscosity of the emulsion is less than 2000 mPa·s at 20° C.

14. An emulsion according to claim 9 wherein the oil phase comprises less than 10% mineral oil by weight of the oil phase.

15. An emulsion according to claim 9 wherein the aqueous phase is dispersed within the oil phase.

* * * * *